(12) United States Patent
Wang et al.

(10) Patent No.: US 12,731,837 B2
(45) Date of Patent: Sep. 8, 2026

(54) BATTERY COVER PLATE ASSEMBLY, BATTERY AND MANUFACTURING METHOD OF BATTERY COVER PLATE ASSEMBLY

(71) Applicant: CALB Group Co., Ltd., Jiangsu (CN)

(72) Inventors: Ke Wang, Changzhou (CN); Xinwei Jiang, Changzhou (CN)

(73) Assignee: CALB Group Co., Ltd., Jiangsu (CN)

( * ) Notice: Subject to any disclaimer, the term of this patent is extended or adjusted under 35 U.S.C. 154(b) by 608 days.

(21) Appl. No.: 18/182,404

(22) Filed: Mar. 13, 2023

(65) Prior Publication Data

US 2024/0047795 A1 Feb. 8, 2024

(30) Foreign Application Priority Data

Aug. 3, 2022 (CN) ......................... 202210927978.7

(51) Int. Cl.
*H01M 50/15* (2021.01)
*H01M 50/159* (2021.01)

(52) U.S. Cl.
CPC ......... *H01M 50/15* (2021.01); *H01M 50/159* (2021.01)

(58) Field of Classification Search
CPC ............................ H01M 50/15; H01M 50/159
See application file for complete search history.

(56) References Cited

U.S. PATENT DOCUMENTS

| | | | | |
|---|---|---|---|---|
| 6,648,715 | B2 | 11/2003 | Wiens et al. | |
| 2020/0295319 | A1* | 9/2020 | Ko | B23K 26/08 |
| 2021/0348630 | A1* | 11/2021 | Bachu | F16B 2/22 |
| 2022/0416337 | A1* | 12/2022 | Xu | H01M 50/152 |

FOREIGN PATENT DOCUMENTS

| | | | | |
|---|---|---|---|---|
| CN | 206133152 | | 4/2017 | |
| CN | 108360737 | | 8/2018 | |
| CN | 108428823 | | 8/2018 | |
| CN | 208955087 U | * | 6/2019 | H01M 50/15 |
| CN | 110797479 A | * | 2/2020 | H01M 10/6551 |
| CN | 112713342 | | 4/2021 | |

(Continued)

OTHER PUBLICATIONS

"Examination Report of India Counterpart Application", issued on Nov. 13, 2025, p. 1-p. 6.

(Continued)

*Primary Examiner* — Jimmy Vo
(74) *Attorney, Agent, or Firm* — JCIP GLOBAL INC.

(57) ABSTRACT

A battery cover plate assembly, a battery, and a manufacturing method of a battery cover plate assembly are provided. The battery cover plate assembly includes: a cover plate provided with a first connection portion and an insulating piece disposed on one side of the cover plate. The insulating piece is provided with a second connection portion, and the first connection portion is connected to the second connection portion. One of the first connection portion and the second connection portion is a mounting hole and the other one is a protrusion, and the protrusion is in an interference fit with the mounting hole. An area of an opening of the mounting hole is less than a maximum area of a cross section of the mounting hole, and the protrusion is inserted into the mounting hole through the opening of the mounting hole.

23 Claims, 7 Drawing Sheets

(56) References Cited

FOREIGN PATENT DOCUMENTS

| | | | | | |
|---|---|---|---|---|---|
| CN | 112713342 | A | * | 4/2021 | |
| CN | 113270695 | | | 8/2021 | |
| CN | 216161824 | | | 4/2022 | |
| EP | 0429746 | | | 6/1991 | |
| EP | 2393138 | | | 12/2011 | |
| EP | 2736091 | A1 | * | 5/2014 | ............ H01M 50/15 |
| EP | 3451411 | | | 10/2019 | |
| EP | 3675237 | | | 7/2020 | |
| EP | 3806177 | | | 4/2021 | |

OTHER PUBLICATIONS

"Search Report of Europe Counterpart Application", issued on Apr. 18, 2024, p. 1-p. 16.

"Partial Search Report of Europe Counterpart Application", issued on Jan. 2, 2024, p. 1-p. 15.

"Office Action of China Counterpart Application", issued on Feb. 6, 2026, p. 1-p. 7.

"Office Action of China Counterpart Application", issued on Aug. 30, 2025, p. 1-p. 8.

"Rejection Decision of China Counterpart Application", issued on May 1, 2026, with English translation thereof, p. 1-p. 10.

* cited by examiner

FIG. 11

BATTERY COVER PLATE ASSEMBLY, BATTERY AND MANUFACTURING METHOD OF BATTERY COVER PLATE ASSEMBLY

CROSS-REFERENCE TO RELATED APPLICATION

This application claims the priority of China patent application serial no. 202210927978.7, filed on Aug. 3, 2022. The entirety of the above-mentioned patent application is hereby incorporated by reference herein and made a part of this specification.

BACKGROUND

Technical Field

The disclosure relates to the technical field of batteries, and in particular, relates a battery cover plate assembly, a battery, and a manufacturing method of a battery cover plate assembly.

Description of Related Art

In the related art, an insulating piece is provided under the cover plate of the battery cover plate assembly for insulation protection. Due to the limitation of the connection between the cover plate and the insulating piece, the connection between the cover plate and the insulating piece may easily become loose after long-term use.

SUMMARY

The disclosure provides a battery cover plate assembly, a battery, and a manufacturing method of a battery cover plate assembly capable of improving the use performance of the battery cover plate assembly.

According to the first aspect of the disclosure, a battery cover plate assembly including a cover plate and an insulating piece is provided.

A first connection portion is arranged on the cover plate.

The insulating piece is disposed on one side of the cover plate. The insulating piece is provided with a second connection portion, and the first connection portion is connected to the second connection portion.

One of the first connection portion and the second connection portion is a mounting hole and the other one is a protrusion, and the protrusion is in an interference fit with the mounting hole. An area of an opening of the mounting hole is less than a maximum area of a cross section of the mounting hole, and the protrusion is inserted into the mounting hole through the opening of the mounting hole.

The battery cover plate assembly provided by an embodiment of the disclosure includes the cover plate and the insulating piece, and the cover plate and the insulating piece are connected to each other through the first connection portion and the second connection portion.

According to the second aspect of the disclosure, the disclosure further provides a battery including the battery cover plate assembly.

The battery provided by an embodiment of the disclosure includes the battery cover plate assembly. The battery cover plate assembly includes the cover plate and the insulating piece, and the cover plate and the insulating piece are connected to each other through the first connection portion and the second connection portion.

According to the third aspect of the disclosure, a manufacturing method of a battery cover plate assembly is provided and includes the following step.

An insulating piece is arranged on one side of a cover plate, so that a first connection portion of the cover plate is connected to a second connection portion of the insulating piece.

One of the first connection portion and the second connection portion is a mounting hole and the other one is a protrusion, and the protrusion is in an interference fit with the mounting hole. An area of an opening of the mounting hole is less than a maximum area of a cross section of the mounting hole, and the protrusion is inserted into the mounting hole through the opening of the mounting hole.

In the manufacturing method of the battery cover plate assembly provided by an embodiment of the disclosure, the cover plate and the insulating piece are connected to each other through the first connection portion and the second connection portion.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

FIG. 11 is a schematic flow chart of a manufacturing method of a battery cover plate assembly according to an exemplary embodiment.

DESCRIPTION OF THE EMBODIMENTS

Figure 1:
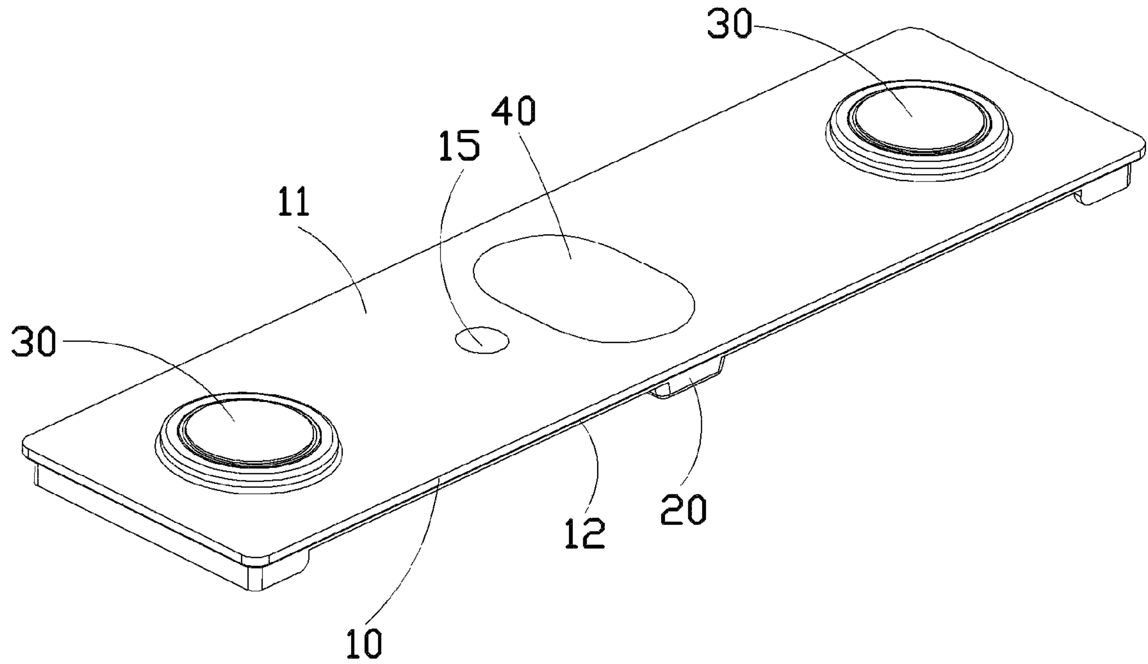
FIG. 1 is a schematic structural view illustrating a battery cover plate assembly according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms “first”, “second” and the like are only used for illustrative purposes and are not to be construed as expressing or implying a relative importance. The term “plurality” is two or more. The term “and/or” includes any and all combinations of one or more of the associated listed items.

In particular, a reference to “the” object or “a” and “an” object is intended to denote also one of a possible plurality of such objects. Unless otherwise defined or described, the terms “connect”, “fix” should be broadly interpreted, for example, the term “connect” can be “fixedly connect”, “detachably connect”, “integrally connect”, “electrically connect” or “signal connect”. The term “connect” also can be “directly connect” or “indirectly connect via a medium”. For the persons skilled in the art, the specific meanings of the abovementioned terms in the present disclosure can be understood according to the specific situation.

Further, in the description of the present disclosure, it should be understood that spatially relative terms, such as “above”, “below” “inside”, “outside” and the like, are described based on orientations illustrated in the figures, but are not intended to limit the exemplary embodiments of the present disclosure.

In the context, it should also be understood that when an element or features is provided “outside” or “inside” of another element(s), it can be directly provided “outside” or “inside” of the other element, or be indirectly provided “outside” or “inside” of the another element(s) by an intermediate element.

An embodiment of the disclosure includes a battery cover plate assembly. With reference to FIG. 1 to FIG. 9, the battery cover plate assembly includes a cover plate 10 provided with a first connection portion and an insulating piece 20 disposed on one side of the cover plate 10. The insulating piece 20 is provided with a second connection portion, and the first connection portion is connected to the second connection portion. One of the first connection portion and the second connection portion is a mounting hole 13 and the other one is a protrusion 21, and the protrusion 21 is in an interference fit with the mounting hole 13. An area of an opening 133 of the mounting hole 13 is less than a maximum area of a cross section of the mounting hole 13, and the protrusion 21 is inserted into the mounting hole 13 through the opening 133 of the mounting hole 13.

The battery cover plate assembly provided by an embodiment of the disclosure includes the cover plate 10 and the insulating piece 20, and the cover plate 10 and the insulating piece 20 are connected to each other through the first connection portion and the second connection portion. By arranging one of the first connection portion and the second connection portion as the mounting hole 13 and the other one as the protrusion 21 and arranging the protrusion 21 and the mounting hole 13 to be in an interference fit, the cover plate 10 and the insulating piece 20 may be reliably fixed. The area of the opening 133 of the mounting hole 13 is less than the maximum area of the cross section of the mounting hole 13, that is, the area of the opening 133 of the mounting hole 13 is relatively small. In this way, the connection stability between the protrusion 21 and the mounting hole 13 may be further improved, the connection stability between the cover plate 10 and the insulating piece 20 is ensured, and the safe use performance of the battery cover plate assembly is thereby improved.

It should be noted that the insulating piece 20 is disposed on one side of the cover plate 10. That is, at least a portion of the insulating piece 20 may be disposed above the cover plate 10, or at least a portion of the insulating piece 20 may be disposed below the cover plate 10, so as to insulate and protect the cover plate 10. In order to ensure the insulation safety performance of the cover plate 10, it is necessary to ensure the connection stability between the cover plate 10 and the insulating piece 20. In this embodiment, the connection stability between the cover plate 10 and the insulating piece 20 may be ensured by the interference fit between the protrusion 21 and the mounting hole 13. Further, the area of the opening 133 of the mounting hole 13 is less than the area of at least a portion of the inner space of the mounting hole 13. On the basis of the interference fit between the protrusion 21 and the mounting hole 13, the opening 133 of the mounting hole 13 may further limit the protrusion 21, as such, it is ensured that the protrusion 21 and the mounting hole 13 are reliably fixed.

A cross section of the mounting hole 13 may be treated as a cross section perpendicular to the extending direction of the mounting hole 13, and the mounting hole 13 may have a plurality of cross sections. The area of the opening 133 of the mounting hole 13 is less than the maximum area of the cross section of the mounting hole 13. That is, the cross-sectional area of at least a portion of the inner space of the mounting hole 13 is greater than the area of the opening 133. For instance, the opening of the mounting hole 13 is a circular hole, and the inner space of the mounting hole 13 may be a cylinder, and in this case, the area of the opening of the mounting hole 13 may be less than the cross-sectional area of the cylinder. Alternatively, the opening of the mounting hole 13 is a circular hole, and the inner space of the mounting hole 13 may be a frustum, and in this case, the area of the opening of the mounting hole 13 may be less than the cross-sectional area of at least a portion of the frustum. Alternatively, the opening of the mounting hole 13 is a circular hole, and the inner space of the mounting hole 13 may be a cylinder and a frustum, and in this case, the area of the opening of the mounting hole 13 may be less than the cross-sectional area of at least a portion of the cylinder and the frustum. Certainly, it is not excluded that the inner space of the mounting hole 13 is an irregular space, as long as it can be ensured that the area of the opening of the mounting hole 13 can be less than the cross-sectional area of at least a portion of the inner space of the mounting hole 13. In this embodiment, it is emphasized that on the basis of the interference fit between the protrusion 21 and the mounting hole 13, the opening 133 of the mounting hole 13 may further limit the protrusion 21. As such, it is ensured that the protrusion 21 and the mounting hole 13 are reliably fixed.

The opening of the mounting hole 13 may be treated as an end port of the mounting hole 13, that is, an end surface of the mounting hole. The orthographic projection of the opening 133 of the mounting hole 13 and the orthographic projection of mounting hole 13 towards the cover plate 10 respectively are a first projection and a second projection, and an area of the first projection is less than an area of the second projection. That is, the maximum circumferential area of the mounting hole 13 may be larger than the area of the opening 133 of the mounting hole 13.

Figure 4:
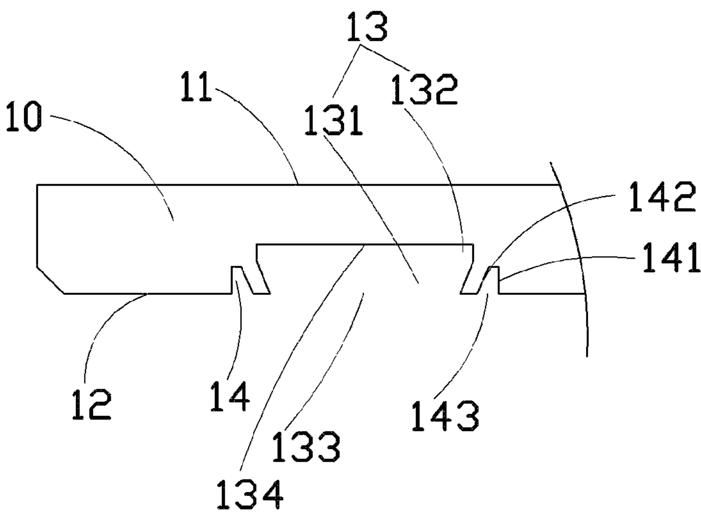
FIG. 4 is a schematic structural cross-sectional view illustrating a portion of the cover plate of the battery cover plate assembly according to the first exemplary embodiment.

In an embodiment, with reference to FIG. 4, the cover plate 10 includes an upper surface 11 and a lower surface 12, and the upper surface 11 and the lower surface 12 are disposed opposite to each other.

In an embodiment, the insulating piece 20 may be disposed on the upper surface 11 of the cover plate 10, so as to achieve insulation protection for the upper surface 11 of the cover plate 10.

Figure 2:
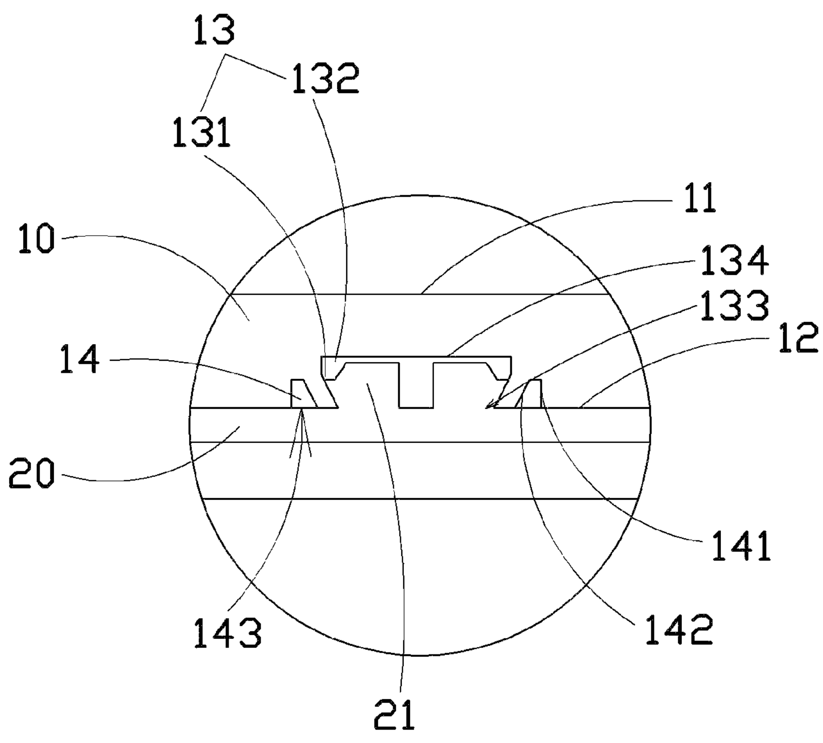
FIG. 2 is a schematic structural cross-sectional view illustrating a portion the battery cover plate assembly according to an exemplary embodiment.

In an embodiment, as shown in FIG. 1 and FIG. 2, the insulating piece 20 may be disposed on the lower surface 12, so as to achieve insulation protection for the lower surface 12 of the cover plate 10.

In an embodiment, the area of the opening 133 of the mounting hole 13 is less than the area of a bottom 134 of the mounting hole 13. The bottom 134 of the mounting hole 13 is the end of the mounting hole 13 away from the opening 133 of the mounting hole 13, and the protrusion 21 is inserted into the mounting hole 13 through the opening 133 of the mounting hole 13. That is, the opening 133 of the mounting hole 13 is the end port through which the protrusion 21 is inserted into the mounting hole 13, and the area of the opening 133 of the mounting hole 13 is less than the area of the bottom 134 of the mounting hole 13. On the basis of ensuring the interference fit between the protrusion 21 and the mounting hole 13, the opening 133 of the mounting hole 13 may further limit and fix the protrusion 21. As such, it is ensured that the protrusion 21 and the mounting hole 13 are reliably fixed. The problem of loose connection between the insulating piece 20 and the cover plate 10 is prevented from occurring after the battery cover plate assembly is used for a long time.

It should be noted that the mounting hole 13 may be a blind hole, and in this case, the bottom 134 of the mounting hole 13 may be the bottom wall of the mounting hole 13. The mounting hole 13 may be a through hole, and in this case, the bottom 134 of the mounting hole 13 may be another opening of the mounting hole 13.

In an embodiment, the mounting hole 13 includes an expansion segment 131, and the expansion segment 131 has the opening 133 of the mounting hole 13. The area of the cross section of the expansion segment 131 gradually increases in a direction from the opening 133 of the mounting hole 13 towards the bottom 134 of the mounting hole 13. Therefore, during the process of inserting the protrusion 21 into the expansion segment 131 from the opening 133, the protrusion 21 may shrink first and then gradually expand, so that the interference fit between the protrusion 21 and the mounting hole 13 is ensured, and the opening 133 with a smaller area can reliably hold the protrusion 21. In this way, the protrusion 21 and the mounting hole 13 are reliably matched, so that the problem of loose connection of the battery cover plate assembly after long-term use is prevented from occurring.

In an embodiment, as shown in FIG. 4, the mounting hole 13 further includes a straight hole segment 132. The straight hole segment 132 communicates with one end of the expansion segment 131 away from the opening 133 of the expansion segment 131, and the area of the cross section of the straight hole segment 131 is consistent in a direction from one end of the straight hole segment 132 connected to the expansion segment 131 towards the bottom 134 of the mounting hole 13. In this way, the straight hole segment 132 may be easily formed, and a portion of the protrusion 21 may be easily located in the straight hole segment 132, so as to ensure that the protrusion is reliably matched with the mounting hole 13.

With reference to FIG. 4, the mounting hole 13 may be formed by the straight hole segment 132 and the expansion segment 131, and the protrusion 21 may gradually extend into the straight hole segment 132 from the expansion segment 131. In this way, the protrusion and the mounting hole 13 may be reliably matched, so as to ensure the reliable connection between the insulating piece 20 and the cover plate 10.

In an embodiment, the expansion segment 131 is a frustum hole segment, and the straight hole segment 132 is a cylindrical hole segment. In this way, the mounting hole 13 may be easily formed, and it is ensured that the mounting hole 13 may reliably fix the protrusion 21. The insulating piece 20 is thus ensured to be stably connected to the cover plate 10, so that the problem of loose connection of the battery cover plate assembly after long-term use is prevented from occurring.

In an embodiment, an included angle between a hole wall of the expansion segment 131 and a hole wall of the straight hole segment 132 is 135° to 179°. As such, the extending tendency of the expansion segment 131 from the straight hole segment 132 to the opening 133 of the expansion segment 131 is a gradual shrinking process. Therefore, on the basis of the interference fit between the protrusion 21 and the mounting hole 13, the opening 133 of the expansion segment 131 may also reliably clamp the protrusion 21.

The included angle between the hole wall of the expansion segment 131 and the hole wall of the straight hole segment 132 may be 135°, 136°, 140°, 145°, 150°, 155°, 156°, 160°, 165°, 170°, 175°, 176°, 178°, or 179° and so on.

In an embodiment, the protrusion 21 includes an elastic portion, and a portion of the protrusion 21 is located in the straight hole segment 132. Therefore, a relatively large portion of the protrusion 21 may extend into the mounting hole 13, so that the fixing performance of the protrusion 21 is ensured.

In an embodiment, at least part of a wall surface of the straight hole segment 131 is spaced apart from the protrusion 21. As such, it is ensured that the protrusion 21 may be fully arranged in the mounting hole 13, and a certain buffer space is provided. Therefore, after the battery cover plate assembly is used for a long time, even if the protrusion 21 is deformed, the mounting hole 13 may still be prevented from being excessively squeezed.

Figure 5:
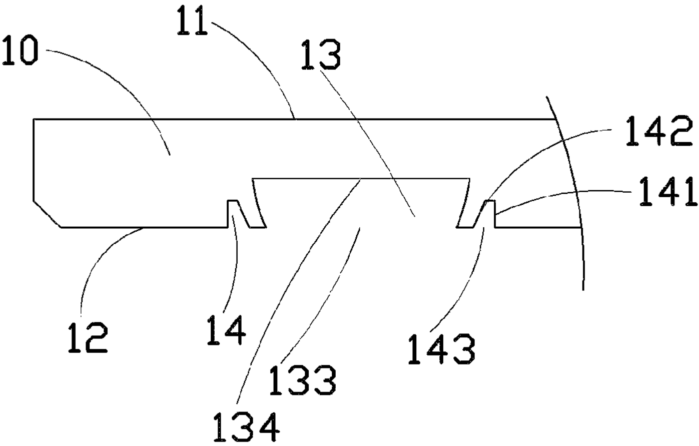
FIG. 5 is a schematic structural cross-sectional view illustrating a portion of the cover plate of the battery cover plate assembly according to the second exemplary embodiment.
Figure 6:
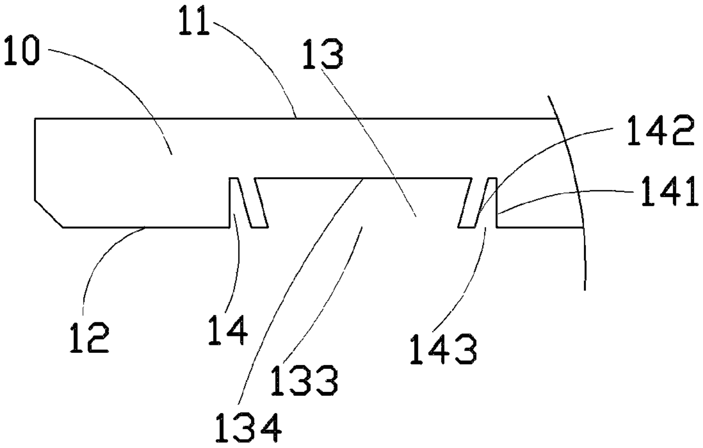
FIG. 6 is a schematic structural cross-sectional view illustrating a portion of the cover plate of the battery cover plate assembly according to the third exemplary embodiment.
Figure 7:
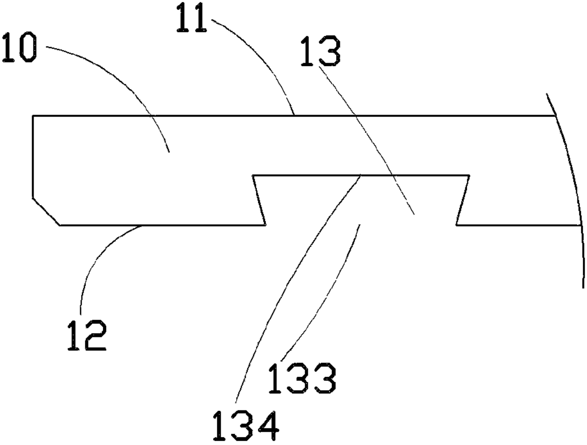
FIG. 7 is a schematic structural cross-sectional view illustrating a portion of the cover plate of the battery cover plate assembly according to the fourth exemplary embodiment.

In an embodiment, as shown in FIG. 5 to FIG. 7, the mounting hole 13 may be an expanded structure as a whole. That is, the cross-sectional area of the expanded structure gradually increases in the direction from the opening 133 of the mounting hole 13 towards the bottom 134 of the mounting hole 13, and the protrusion 21 may thus be reliably fixed. The protrusion is generally embedded in the mounting hole 13 in an upside-down manner, so that the protrusion 21 and the mounting hole 13 may be reliably matched. The expanded structure may be a frustum as a whole, or the expanded structure may be an irregular structure with structural changes, which is not limited herein.

In an embodiment, the cover plate 10 is a metal piece, the insulating piece 20 is a plastic piece, the first connection portion is the mounting hole 13, the second connection portion is the protrusion 21, and the protrusion 21 is in an interference fit with the mounting hole 13, so that the cover plate 10 and the insulating piece 20 are reliably fixed. The insulating part is a plastic piece and can be formed into protrusions 21 with different structures by injection molding. The cover plate 10 is a metal piece, which is relatively difficult to form. The mounting hole 13 is provided on the metal piece, so that the deformation of the mounting hole 13 caused by the protrusion 21 may be prevented from occurring, and the stability of the structure is thereby ensured.

In an embodiment, the cover plate 10 is a metal piece, the first connection portion is the mounting hole 13, and the mounting hole 13 is formed by stamping. In this way, the mounting hole 13 may be easily manufactured, and the structural strength of the cover plate 10 is improved, that is, the mounting hole 13 formed by stamping may act as a reinforcing structure.

In an embodiment, with reference to FIG. 4 to FIG. 7 together, the mounting hole 13 is a blind hole, and the area of the opening 133 of the mounting hole 13 is less than the area of the bottom 134 of the mounting hole 13. Since the side wall of the mounting hole 13 is arranged to be slope-shaped, the structural strength of the cover plate 10 is prevented from being affected by the mounting hole 13.

In an embodiment, as shown in FIG. 2, the top end of the protrusion 21 is spaced apart from the bottom 134 of the mounting hole 13, so that the protrusion 21 can be mounted in place. Further, the problem of the mounting hole 13 being excessively squeezed caused by the deformation of the protrusion 21 after long-term use may be prevented from occurring.

In an embodiment, the distance between the top end of the protrusion 21 and the bottom 134 of the mounting hole 13 is 0.01 mm to 1 mm. Since the protrusion 21 is ensured to be mounted in place, the protrusion 21 may also be deformed and thus squeezes the mounting hole 13 after long-term use.

The distance between the top end of the protrusion 21 and the bottom 134 of the mounting hole 13 may be 0.01 mm, 0.05 mm, 0.1 mm, 0.2 mm, 0.3 mm, 0.4 mm, 0.5 mm, 0.6 mm, 0.7 mm, 0.8 mm, 0.9 mm, or 1 mm and so on.

In an embodiment, the mounting hole 13 is a circumferentially closed hole, so that the protrusion 21 can be reliably matched with the mounting hole 13, the protrusion 21 and the mounting hole 13 have a reliable contact area, and the mounting hole 13 may be easily formed.

In some embodiments, the mounting hole 13 may be a circumferentially non-closed hole.

Figure 9:
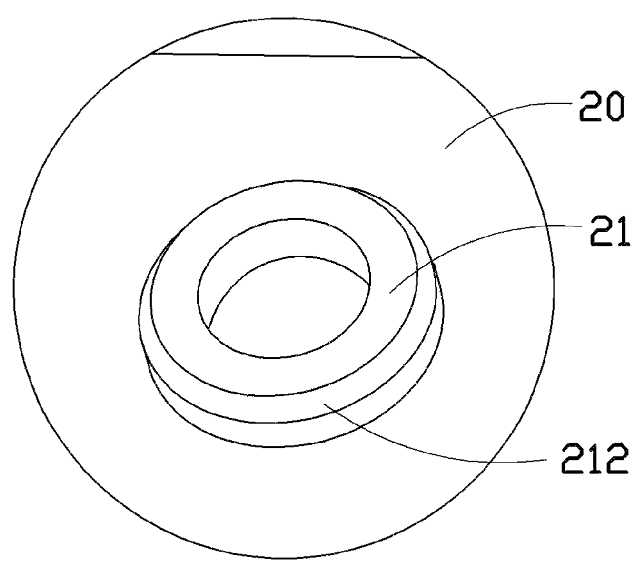
FIG. 9 is a schematic structural view illustrating a portion of the insulating piece of the battery cover plate assembly according to an exemplary embodiment.

In an embodiment, as shown in FIG. 9, an upper portion of the protrusion 21 is provided with a guide surface 212, so that the protrusion 21 extends into the mounting hole 13 through the guide surface 212. Therefore, the protrusion 21 may easily extend into the mounting hole 13, so the assembly efficiency of the protrusion 21 and the mounting hole 13 is improved, and the assembly efficiency of the battery cover plate assembly is also improved.

In an embodiment, an extension line of the guide surface 212 from a bottom end to a top end is a curve or a straight line. That is, the line formed by the longitudinal section of the guide surface 212 may be a straight line or a curved line. On the basis of convenient processing, the protrusion 21 may easily extends into the mounting hole 13, and the assembly efficiency of the protrusion 21 and the mounting hole 13 is thereby improved.

It should be noted that the guide surface 212 may be formed on part of the circumferential outer side of the protrusion 21, or the guide surface 212 may be formed on the entire circumferential outer side of the protrusion 21. The purpose of the arrangement of the guide surface 212 is to allow the protrusion 21 to easily extend into the mounting hole 13, to make the edge of the protrusion 21 smooth, and to avoid damage to related structures when the protrusion 21 extends into the mounting hole 13.

In an embodiment, an adhesive layer is arranged between the protrusion 21 and the mounting hole 13. In this way, the protrusion 21 and the mounting hole 13 may achieve second connection through the adhesive layer, the protrusion 21 and the mounting hole 13 are ensured to be stably connected, and the connection stability between the cover plate 10 and the insulating member 20 is further improved.

The adhesive layer between the protrusion 21 and the mounting hole 13 may be the glue in the related art, which is not limited herein. The adhesive layer may be solid adhesive, and the adhesive layer may also be liquid adhesive, which is not limited herein.

In an embodiment, an adhesive layer is provided on the hole wall of the mounting hole 13 to allow the protrusion 21 to be connected to the adhesive layer after being inserted into the mounting hole 13. In this way, the protrusion 21 may be easily arranged, and it is ensured that the protrusion 21 and the mounting hole 13 may be reliably connected through the adhesive layer.

In some embodiments, the protrusion 21 is provided with the adhesive layer, so that after the protrusion 21 is inserted into the mounting hole 13, the protrusion 21 may form a connection with the hole wall of the mounting hole 13.

In an embodiment, the adhesive layer is provided on the side wall of the mounting hole 13, so that after the protrusion 21 is inserted into the mounting hole 13, the side wall of the protrusion 21 may be reliably connected to the side wall of the mounting hole 13, and the protrusion 21 and the mounting hole 13 are thus ensured to be reliably connected.

In some embodiments, an adhesive layer may be provided on the bottom wall of the mounting hole 13, so that the top end of the protrusion 21 and the bottom wall of the mounting hole 13 may be connected to each other through the adhesive layer.

In an embodiment, as shown in FIG. 4 to FIG. 6, the cover plate 10 or the insulating piece 20 is provided with a groove 14, and the groove 14 surrounds the mounting hole 13, so that the groove 14 and the mounting hole 13 are spaced apart. Besides, the groove 14 may be a process hole to assist the formation of the mounting hole 13, or the groove 14 may serve as a buffer structure. In this way, the solid structure between the groove 14 and the mounting hole 13 can form a buffer, and the connection stability between the protrusion 21 and the mounting hole 13 is thus improved.

In an embodiment, with reference to FIG. 2, a notch 143 of the groove 14 and the opening 133 of the mounting hole 13 may be on the same plane. The distance between the notch 143 of the groove 14 and the opening 133 of the mounting hole 13 is 0.2 mm to 1 mm, and/or the distance between the groove 14 and the mounting hole 13 is 0.2 mm to 1 mm. Through the above arrangement, it is avoided that the distance between the notch 143 of the groove 14 and the opening 133 of the mounting hole 13 is excessively close to cause the structure to become less stable, and it is also avoided that the distance between the notch 143 of the groove 14 and the opening 133 of the mounting hole 13 is excessively long, which is inconvenient for structural molding.

The distance between the notch 143 of the groove 14 and the opening 133 of the mounting hole 13 may be 0.2 mm, 0.25 mm, 0.3 mm, 0.4 mm, 0.5 mm, 0.6 mm, 0.7 mm, 0.8 mm, 0.9 mm, 0.95 mm, or 1 mm and so on.

The distance between the groove 14 and the mounting hole 13 may be further treated as the physical thickness between the mounting hole 13 and the groove 14.

The distance between the groove 14 and the mounting hole 13 may be 0.2 mm, 0.25 mm, 0.3 mm, 0.4 mm, 0.5 mm, 0.6 mm, 0.7 mm, 0.8 mm, 0.9 mm, 0.95 mm, or 1 mm and so on.

In an embodiment, the depth of the groove 14 is not greater than the depth of the mounting hole 13, so that the groove 14 may assist the forming of the mounting hole 13, and the groove 14 is also prevented from being excessively large to affect the structural strength.

In an embodiment, the difference between the depth of the mounting hole 13 and the depth of the groove 14 is 0 mm to 0.5 mm. In this way, it is ensured that the depth of the groove 14 is not greater than the depth of the mounting hole 13, and the problem of weakening the structural strength caused by an excessively large difference between the depth of the mounting hole 13 and the depth of the groove 14 may also be prevented from occurring.

The difference between the depth of the mounting hole 13 and the depth of the groove 14 may be 0, 0.05 mm, 0.1 mm, 0.2 mm, 0.3 mm, 0.4 mm, 0.45 mm, or 0.5 mm, and so on.

In an embodiment, the groove 14 is formed by stamping, so that the mounting hole 13 is provided with the expansion segment 131. That is, the mounting hole 13 may be formed with the straight hole segment first, and the groove 14 may be formed later, so that at least part of the straight hole segment forms the expansion segment 131.

In an embodiment, the depth of the groove 14 is less than the depth of the mounting hole 13, so that the mounting hole 13 is formed by the expansion segment 131 and the straight hole segment 132. That is, the mounting hole 13 may be formed with a larger straight hole segment first, and the groove 14 may be formed later, so that a portion of the straight hole segment forms the expansion segment 131, and the rest of the straight hole segment serves as the straight hole segment 132, as shown in FIG. 4.

In an embodiment, as shown in FIG. 4 to FIG. 6, the groove 14 includes a first side wall 141 and a second side wall 142 opposite to each other. The first side wall 141 is located on the side of the groove 14 away from the mounting hole 13, the second side wall 142 is located on the side of the groove 14 close to the mounting hole 13, and the second side wall 142 is inclined towards the side close to the mounting hole 13 with respect to the first side wall 141. As such, in the process of forming the groove 14, the expansion segment 131 of the mounting hole 13 may be formed.

With reference to FIG. 4, the mounting hole 13 is formed by the expansion segment 131 and the straight hole segment 132, and the depth of the groove 14 is approximately equal to the depth of the expansion segment 131, so that the expansion segment 131 can be formed during the process of forming the groove 14.

With reference to FIG. 5, the mounting hole 13 may be approximately the expansion segment 131, and the depth of the groove 14 is less than the depth of the expansion segment 131. The mounting hole 13 may be formed by machining, or a portion of the expansion segment 131 may be formed in the process of forming the groove 14.

With reference to FIG. 6, the mounting hole 13 is formed by the expansion segment 131, and the depth of the groove 14 is approximately equal to the depth of the expansion segment 13. That is, the depth of the groove 14 is approximately equal to the depth of the mounting hole 13, so that the expansion segment 131 may be formed in the process of forming the groove 14.

With reference to FIG. 7, the cover plate 10 may only be provided with mounting hole 13 without the groove 14, and the mounting hole 13 may be formed by machining.

In an embodiment, as shown in FIG. 4, the first side wall 141 is substantially perpendicular to the bottom wall of the groove 14. That is, the first side wall 141 may be a straight wall and the second side wall 142 may be an inclined wall, so that in the process of forming the groove 14 by stamping, the excess material may be squeezed towards the mounting hole 13 as much as possible, so the inclined wall may be formed. Through the arrangement of the straight wall, the extrusion of the material to the side away from the mounting hole 13 may be avoided as much as possible, and it can also be ensured that the material is extruded to the side close to the mounting hole 13 to form an inclined wall.

The depth of the groove 14 is less than the depth of the mounting hole 13, so that when groove 14 is stamped, the mounting hole 13 may formed by the expansion segment 131 and the straight hole segment 132. That is, a larger straight hole segment may be formed first, and the groove 14 may be formed later, so that a portion of the straight hole segment forms the expansion segment 131, and the rest of the straight hole segment serves as the straight hole segment 132.

In an embodiment, a plurality of first connection portions are provided and a plurality of second connection portions are provided. The first connection portions and the second connection portions are connected to each other, so the cover plate 10 and the insulating piece 20 are reliably connected to each other in this way.

Figure 3:
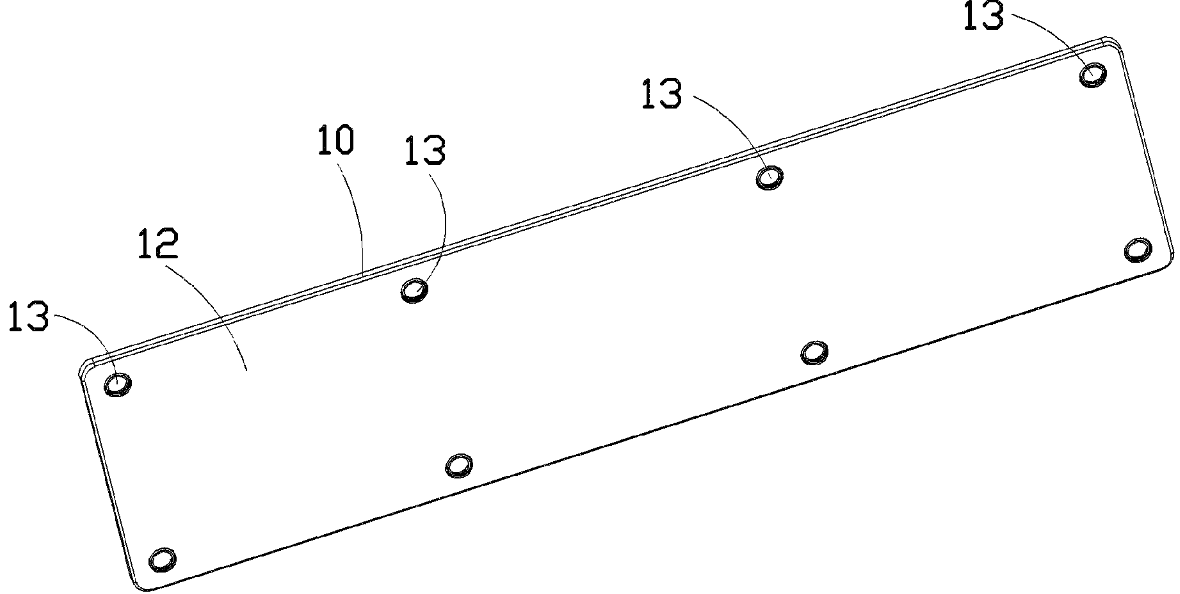
FIG. 3 is a schematic structural view illustrating a cover plate of the battery cover plate assembly according to an exemplary embodiment.
Figure 8:
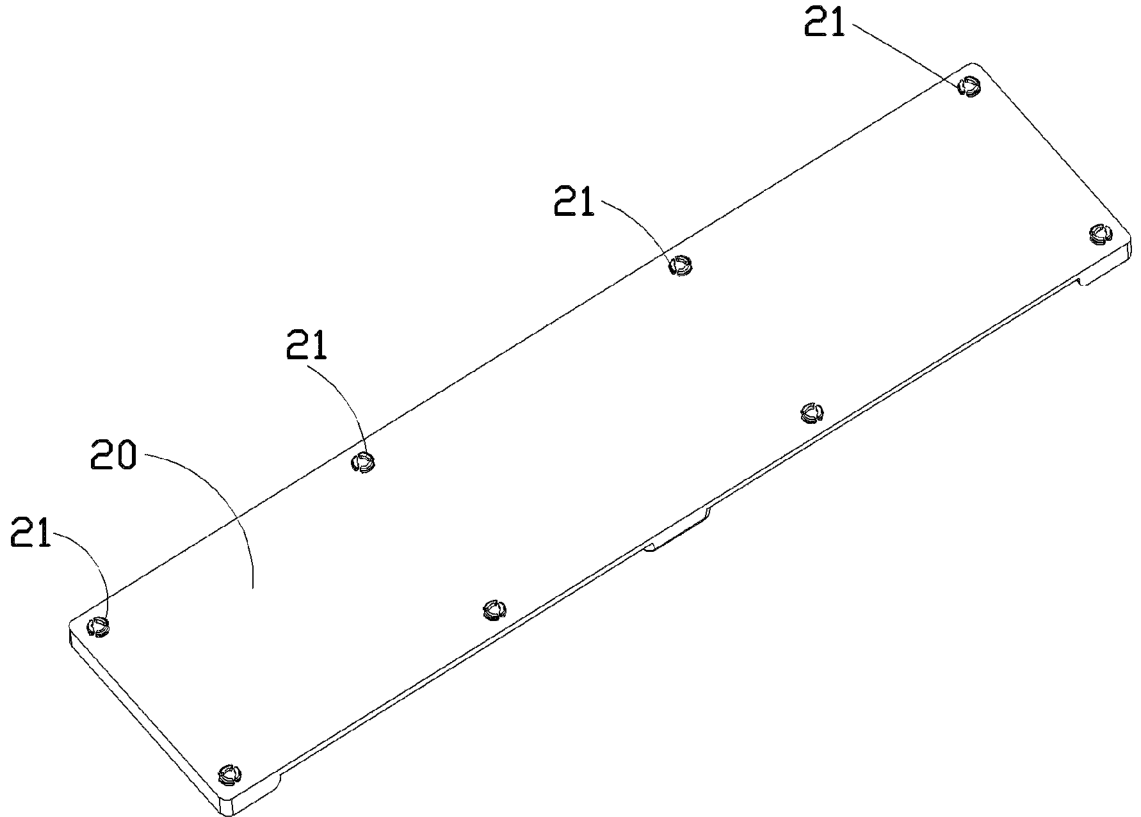
FIG. 8 is a schematic structural view illustrating an insulating piece of the battery cover plate assembly according to an exemplary embodiment.

With reference to FIG. 3 and FIG. 8, a plurality of mounting holes 13 are provided and a plurality of protrusions 21 are provided. The protrusions 21 and the mounting holes 13 are connected to each other, so the cover plate 10 and the insulating piece 20 are reliably connected to each other in this way.

The protrusion 21 may be a one-piece structure, that is, the protrusion 21 may be an integral structure, as shown in FIG. 9. Alternatively, the protrusion 21 may include a plurality of independent structures, and the plurality of independent structures are in an interference fit with the mounting hole 13.

In one embodiment, the diameter of the mounting hole 13 ranges from 2 mm to 10 mm. This ensures that the mounting hole 13 has a relatively large volume, and the mounting hole 13 is also prevented from being excessively large and occupying too much space, so that only a relatively small space of the cover plate 10 or the insulating piece 20 is occupied. The diameter of the largest circumferential outer edge of the protrusion 21 is larger than the diameter of the opening 133 of the mounting hole 13. That is, the maximum area of the cross section of the protrusion 21 is larger than the area of the opening 133 of the mounting hole 13, so as to ensure the interference fit between the protrusion 21 and the mounting hole 13.

In an embodiment, as shown in FIG. 1, the cover plate 10 is provided with a liquid injection hole 15 through which the battery can be injected with liquid inside, and the liquid injection hole 15 may be sealed by a sealing structure.

In an embodiment, as shown in FIG. 1, the battery cover plate assembly further includes a terminal component 30 and an explosion-proof valve 40. Two terminal components 30 may be provided, the two terminal components 30 may be spaced apart from each other on the cover plate 10, and the explosion-proof valve 40 may be located between the two terminal components 30.

In an embodiment, the battery cover plate assembly is a square battery cover plate assembly.

An embodiment of the disclosure further provides a battery including the abovementioned battery cover plate assembly.

A battery provided by an embodiment of the disclosure includes a battery cover plate assembly. The battery cover plate assembly includes the cover plate 10 and the insulating piece 20, and the cover plate 10 and the insulating piece 20 are connected to each other through the first connection portion and the second connection portion. By arranging one of the first connection portion and the second connection portion as the mounting hole 13 and the other one as the protrusion 21 and arranging the protrusion 21 and the mounting hole 13 to be in an interference fit, the cover plate 10 and the insulating piece 20 may be reliably fixed. The area of the opening 133 of the mounting hole 13 is less than the maximum area of the cross section of the mounting hole 13, that is, the area of the opening 133 of the mounting hole 13 is relatively small. In this way, the connection stability between the protrusion 21 and the mounting hole 13 may be further improved, the connection stability between the cover plate 10 and the insulating piece 20 is ensured, and the safe use performance of the battery is thereby improved.

Figure 10:
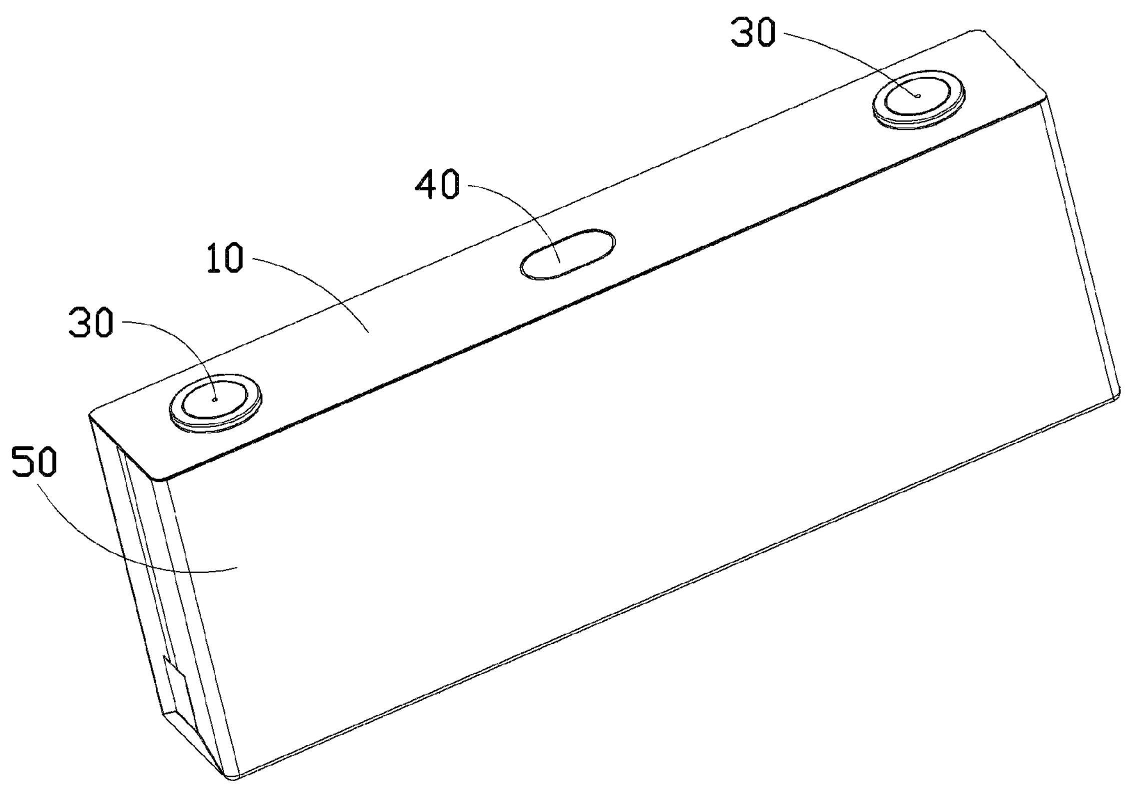
FIG. 10 is a schematic structural view illustrating a battery according to an exemplary embodiment.

With reference to FIG. 10, the battery further includes a casing 50, the battery cover plate assembly is connected to the casing 50, and the cover plate 10 may be welded to the casing 50. The battery further includes a cell, and the cell is disposed in the battery cover plate assembly and the casing 50. The battery may be a quadrangular prismatic battery, that is, a square battery.

The battery includes a cell and an electrolyte, and the battery is the smallest unit capable of performing electrochemical reactions such as charging/discharging. The cell refers to a unit formed by winding or laminating a stacked part, and the stacked part includes a first electrode, a separator, and a second electrode. When the first electrode is a positive electrode, the second electrode is a negative electrode. The polarities of the first electrode and the second electrode may be interchanged.

In an embodiment, the battery is a laminated battery, which may be conveniently assembled and may further be processed to obtain a battery with a longer length.

To be specific, the cell is a laminated cell. The cell has first electrode pieces that are stacked on each other, second electrode pieces whose electrical properties are opposite to the first electrode pieces, and diaphragm pieces disposed between the first electrode pieces and the second electrode pieces. Therefore, multiple pairs of the first electrode pieces and the second electrode pieces are stacked to form the laminated cell.

Optionally, the battery may be a wound battery. That is, the first electrode pieces, the second electrode pieces whose electrical properties are opposite to the first electrode pieces, and the diaphragm pieces disposed between the first electrode pieces and the second electrode pieces are wound to obtain a wound cell.

An embodiment of the disclosure further provides a battery apparatus including the abovementioned battery.

A battery of a battery apparatus provided by an embodiment of the disclosure includes a battery cover plate assembly. The battery cover plate assembly includes the cover plate 10 and the insulating piece 20, and the cover plate 10 and the insulating piece 20 are connected to each other through the first connection portion and the second connection portion. By arranging one of the first connection portion and the second connection portion as the mounting hole 13 and the other one as the protrusion 21 and arranging the protrusion 21 and the mounting hole 13 to be in an interference fit, the cover plate 10 and the insulating piece 20 may be reliably fixed. The area of the opening 133 of the mounting hole 13 is less than the maximum area of the cross section of the mounting hole 13, that is, the area of the opening 133 of the mounting hole 13 is relatively small. In this way, the connection stability between the protrusion 21 and the mounting hole 13 may be further improved, the connection stability between the cover plate 10 and the insulating piece 20 is ensured, and the safe use performance of the battery apparatus is thereby improved.

In an embodiment, the battery apparatus is a battery module or a battery pack.

The battery module includes a plurality of batteries, and the battery module may further include end plates and side plates. The end plates and the side plates are configured to secure a plurality of batteries.

Note that a plurality of batteries may be formed into a battery module and then may be arranged in a battery box, and the plurality of batteries may be secured by the end plates and the side plates. The plurality of batteries may be directly disposed in the battery box, that is, the plurality of batteries are not required to be arranged into groups, and the end plates and the side plates may then be removed.

Figure 11:
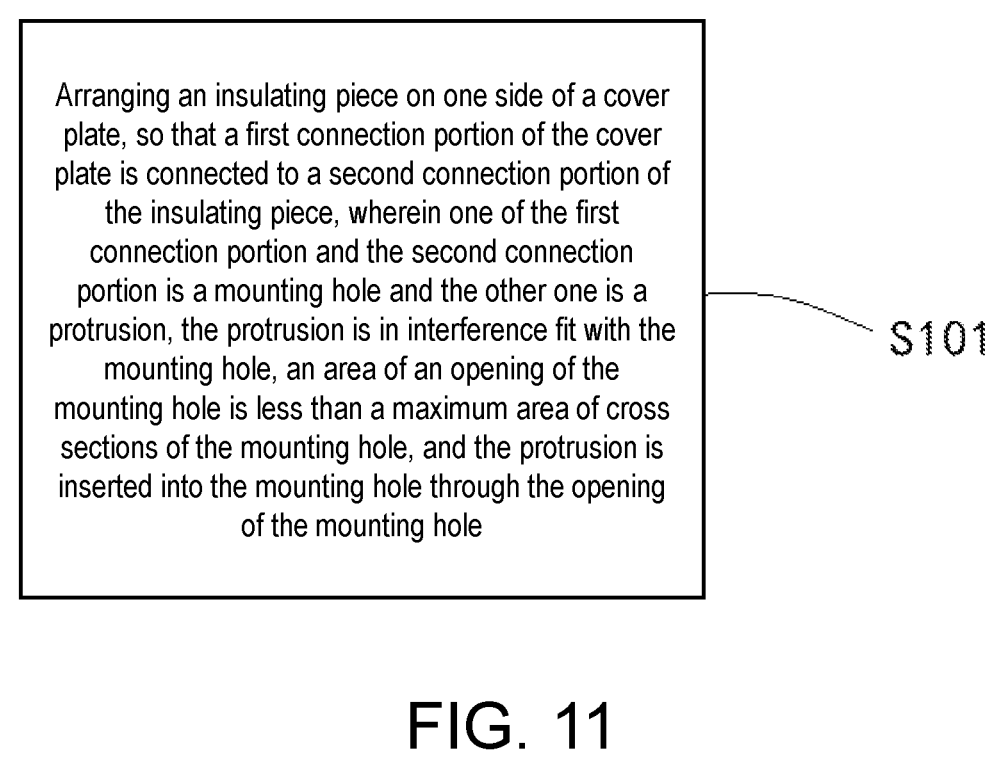

An embodiment of the disclosure further provides a manufacturing method of a battery cover plate assembly. With reference to FIG. 11, the manufacturing method of the battery cover plate assembly includes the following step.

In S101, the insulating piece 20 is arranged on one side of the cover plate 10, so that the first connection portion of the cover plate 10 is connected to the second connection portion of the insulating piece 20.

One of the first connection portion and the second connection portion is a mounting hole 13 and the other one is a protrusion 21, and the protrusion 21 is in an interference fit with the mounting hole 13. An area of an opening 133 of the mounting hole 13 is less than a maximum area of a cross section of the mounting hole 13, and the protrusion 21 is inserted into the mounting hole 13 through the opening 133 of the mounting hole 13.

In the manufacturing method of the battery cover plate assembly provided by an embodiment of the disclosure, the cover plate 10 and the insulating piece 20 are connected to each other through the first connection portion and the second connection portion. By arranging one of the first connection portion and the second connection portion as the mounting hole 13 and the other one as the protrusion 21 and arranging the protrusion 21 and the mounting hole 13 to be in an interference fit, the cover plate 10 and the insulating piece 20 may be reliably fixed. The area of the opening 133 of the mounting hole 13 is less than the maximum area of the cross section of the mounting hole 13, that is, the area of the opening 133 of the mounting hole 13 is relatively small. In this way, the connection stability between the protrusion 21 and the mounting hole 13 may be further improved, the connection stability between the cover plate 10 and the insulating piece 20 is ensured, and the safe use performance of the battery cover plate assembly is thereby improved.

In an embodiment, the manufacturing method of the battery cover plate assembly further includes the following step. An adhesive layer is arranged between the protrusion 21 and the mounting hole 13. In this way, the protrusion 21 and the mounting hole 13 may achieve second connection through the adhesive layer, the protrusion 21 and the mounting hole 13 are ensured to be stably connected, and the connection stability between the cover plate 10 and the insulating member 20 is further improved.

In an embodiment, arranging the adhesive layer between the protrusion 21 and the mounting hole 13 further includes the following step. After the adhesive layer is arranged on at least one of the protrusion 21 and the mounting hole 13, the protrusion 21 is inserted into the mounting hole 13, so that the protrusion 21 and the mounting hole 13 may be reliably connected.

Before the cover plate 10 is connected to the insulating piece 20, the adhesive layer is arranged on the protrusion 21, and then the protrusion 21 is inserted into the mounting hole 13, so that the adhesive layer is connected to both the protrusion 21 and the mounting hole 13. Alternatively, before the cover plate 10 is connected to the insulating piece 20, the adhesive layer is arranged on the hole wall of the mounting hole 13, and then the protrusion 21 is inserted into the mounting hole 13, so that the adhesive layer is connected to both the protrusion 21 and the mounting hole 13. Alternatively, before the cover plate 10 is connected to the insulating piece 20, the adhesive layer is arranged on the protrusion 21, the adhesive layer is arranged on the hole wall of the mounting hole 13, and then the protrusion 21 is inserted into the mounting hole 13, so that the adhesive layer is connected to both the protrusion 21 and the mounting hole 13.

In an embodiment, after the protrusion 21 is inserted into the mounting hole 13, the adhesive layer is injected between the protrusion 21 and the mounting hole 13, so that the protrusion 21 and the mounting hole 13 are reliably connected.

After the protrusion 21 is inserted into the mounting hole 13, the protrusion 21 and the mounting hole 13 achieve an interference fit. A glue injection hole may be provided on the protrusion 21, and the glue injection hole is subsequently injected into the protrusion 21 and the mounting hole 13, so that an adhesive layer is connected to both the protrusion 21 and the mounting hole 13.

In an embodiment, forming the mounting hole 13 on the cover plate 10 or the insulating piece 20 includes the following. The area of the opening 133 of the mounting hole 13 is allowed to be less than the area of the bottom 134 of the mounting hole 13. Herein, the bottom 134 of the mounting hole 13 is the end of the mounting hole 13 away from the opening 133 of the mounting hole 13, and the protrusion 21 is inserted into the mounting hole 13 through the opening 133 of the mounting hole 13. That is, the opening 133 of the mounting hole 13 is the end port through which the protrusion 21 is inserted into the mounting hole 13, and the area of the opening 133 of the mounting hole 13 is less than the area of the bottom 134 of the mounting hole 13. On the basis of ensuring the interference fit between the protrusion 21 and the mounting hole 13, the opening 133 of the mounting hole 13 may further limit and fix the protrusion 21. As such, it is ensured that the protrusion 21 and the mounting hole 13 are reliably fixed. The problem of loose connection between the insulating piece 20 and the cover plate 10 is prevented from occurring after the battery cover plate assembly is used for a long time.

In an embodiment, allowing the area of the opening 133 of the mounting hole 13 to be less than the area of the bottom 134 of the mounting hole 13 includes the following. The straight hole segment is formed on the cover plate 10 or the insulating piece 20. The groove 14 is formed on the cover plate 10 or the insulating piece 20, and the side wall of the groove 14 close to the straight hole segment is arranged to be inclined, so that at least a portion of the straight hole segment is pressed. Therefore, at least part of the straight hole segment may be formed into a structure that gradually expands from the opening to the bottom, so as to ensure the reliable and fixed connection between the protrusion 21 and the mounting hole 13.

In an embodiment, the straight hole segment and the groove 14 are stamped and formed in sequence, and a portion of the straight hole segment is pressed during the stamping process of the groove 14, so as to form the mounting hole 13 formed by the straight hole segment 132 and the expansion segment 131. By stamping and forming the straight hole segment and the groove 14 in sequence, a simple process is provided, and the expansion segment 131 may be formed during the process of forming the groove 14, so the forming efficiency of the mounting hole 13 is thereby improved.

The groove 14 formed by stamping includes the first side wall 141 and the second side wall 142 opposite to each other. The first side wall 141 is located on the side of the groove 14 away from the mounting hole 13, the second side wall 142 is located on the side of the groove 14 close to the mounting hole 13, and the second side wall 142 is inclined towards the side close to the mounting hole 13 with respect to the first side wall 141. As such, in the process of forming the groove 14, the expansion segment 131 of the mounting hole 13 may be formed.

In an embodiment, the manufacturing method of the battery cover plate assembly forms the abovementioned battery cover plate assembly.

It should be noted that for the related structures involved in the manufacturing method of the battery cover plate assembly in this embodiment, reference may be made to description of the abovementioned battery cover plate assembly, for example, the formed mounting hole 13 may be a blind hole, etc., and description thereof is not repeated herein.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery cover plate assembly, comprising:

a cover plate, wherein a first connection portion is arranged on the cover plate; and an insulating piece, wherein the insulating piece is disposed on one side of the cover plate, the insulating piece is provided with a second connection portion, and the first connection portion is connected to the second connection portion, wherein one of the first connection portion and the second connection portion is a mounting hole and the other one is a protrusion, the protrusion is in an interference fit with the mounting hole, an area of an opening of the mounting hole is less than a maximum area of a cross section of the mounting hole, and the protrusion is inserted into the mounting hole through the opening of the mounting hole, wherein the mounting hole is a blind hole, and the area of the opening of the mounting hole is less than the area of the bottom of the mounting hole, wherein a top end of the protrusion is spaced apart from the bottom of the mounting hole, wherein a distance between the top end of the protrusion and the bottom of the mounting hole is 0.01 mm to 1 mm.

2. The battery cover plate assembly according to claim 1, wherein the area of the opening of the mounting hole is less than an area of a bottom of the mounting hole, and the bottom of the mounting hole is one end of the mounting hole away from the opening of the mounting hole.

3. The battery cover plate assembly according to claim 2, wherein the mounting hole comprises an expansion segment, the expansion segment has the opening of the mounting hole, and an area of a cross section of the expansion segment gradually increases in a direction from the opening of the mounting hole towards the bottom of the mounting hole.

4. The battery cover plate assembly according to claim 3, wherein the mounting hole further comprises a straight hole segment, the straight hole segment communicates with one end of the expansion segment away from the opening of the expansion segment, and an areas of a cross section of the straight hole segment is consistent in a direction from one end of the straight hole segment connected to the expansion segment towards the bottom of the mounting hole.

5. The battery cover plate assembly according to claim 4, wherein the expansion segment is a frustum hole segment, and the straight hole segment is a cylindrical hole segment.

6. The battery cover plate assembly according to claim 5, wherein an included angle between a hole wall of the expansion segment and a hole wall of the straight hole segment is 135° to 179°.

7. The battery cover plate assembly according to claim 4, wherein the protrusion comprises an elastic portion, and a portion of the protrusion is located in the straight hole segment, wherein at least part of a wall surface of the straight hole segment is spaced apart from the protrusion.

8. The battery cover plate assembly according to claim 1, wherein the cover plate is a metal piece, the insulating piece is a plastic piece, the first connection portion is the mounting hole, and the second connection portion is the protrusion.

9. The battery cover plate assembly according to claim 8, wherein the mounting hole is formed by stamping.

10. The battery cover plate assembly according to claim 1, wherein the mounting hole is a circumferentially closed hole.

11. The battery cover plate assembly according to claim 1, wherein an upper portion of the protrusion is provided with a guide surface, so that the protrusion extends into the mounting hole through the guide surface.

12. The battery cover plate assembly according to claim 11, wherein an extension line of the guide surface from a bottom end to a top end is a curve or a straight line.

13. The battery cover plate assembly according to claim 1, wherein an adhesive layer is arranged between the protrusion and the mounting hole.

14. The battery cover plate assembly according to claim 1, wherein the cover plate or the insulating piece is provided with a groove, and the groove surrounds the mounting hole.

15. The battery cover plate assembly according to claim 14, wherein a distance between a notch of the groove and the opening of the mounting hole is 0.2 mm to 1 mm, and/or a distance between the groove and the mounting hole is 0.2 mm to 1 mm.

16. The battery cover plate assembly according to claim 14, wherein a depth of the groove is not greater than a depth of the mounting hole, or a difference between the depth of the mounting hole and the depth of the groove is 0 mm to 0.5 mm.

17. The battery cover plate assembly according to claim 15, wherein the groove comprises a first side wall and a second side wall opposite to each other, the first side wall is located on one side of the groove away from the mounting hole, the second side wall is located on one side of the groove close to the mounting hole, and the second side wall is inclined towards the side close to the mounting hole relative to the first side wall.

18. The battery cover plate assembly according to claim 16, wherein the groove comprises a first side wall and a second side wall opposite to each other, the first side wall is located on one side of the groove away from the mounting hole, the second side wall is located on one side of the groove close to the mounting hole, and the second side wall is inclined towards the side close to the mounting hole relative to the first side wall.

19. The battery cover plate assembly according to claim 17, wherein the first side wall is substantially perpendicular to a bottom wall of the groove.

20. The battery cover plate assembly according to claim 18, wherein the first side wall is substantially perpendicular to a bottom wall of the groove.

21. The battery cover plate assembly according to claim 1, wherein a plurality of first connection portions are provided, and a plurality of second connection portions are provided.

22. The battery cover plate assembly according to claim 1, wherein a diameter of the mounting hole ranges from 2 mm to 10 mm.

23. A battery, comprising the battery cover plate assembly according to claim 1.

* * * * *